US011149803B1

(12) United States Patent
Morales et al.

(10) Patent No.: US 11,149,803 B1
(45) Date of Patent: Oct. 19, 2021

(54) MECHANISM AND METHOD TO ENGAGE/DISENGAGE A SPRAG CLUTCH USING ACTUATORS

(71) Applicant: Bell Textron Inc., Fort Worth, TX (US)

(72) Inventors: Gilberto Morales, Arlington, TX (US); Carlos Alexander Fenny, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 16/894,847

(22) Filed: Jun. 7, 2020

(51) Int. Cl.
*F16D 41/069* (2006.01)
*F16D 48/06* (2006.01)
*F16D 28/00* (2006.01)
*F16D 41/06* (2006.01)
*F16D 121/28* (2012.01)

(52) U.S. Cl.
CPC ......... *F16D 41/069* (2013.01); *F16D 28/00* (2013.01); *F16D 48/064* (2013.01); *F16D 2041/0603* (2013.01); *F16D 2121/28* (2013.01); *F16D 2300/021* (2013.01); *F16D 2500/1023* (2013.01); *F16D 2500/3028* (2013.01); *F16D 2500/30404* (2013.01)

(58) Field of Classification Search
CPC .... F16D 41/069; F16D 41/067; F16D 41/068; F16D 41/07; F16D 41/084; F16D 41/00-36; F16D 28/00; F16D 48/064; F16D 2041/0603; F16D 2121/28; F16D 2300/021; F16D 2500/1023; F16D 2500/3028; F16D 2500/30404

USPC ........................................................ 192/41 A
See application file for complete search history.

(56) References Cited

U.S. PATENT DOCUMENTS

| 2,683,509 | A | * | 7/1954 | Jandasek | F16D 41/07 |
| | | | | | 192/45.1 |
| 4,756,395 | A | | 7/1988 | Zlotek | |
| 9,121,454 | B2 | * | 9/2015 | Pawley | F16D 41/16 |
| 10,837,304 | B2 | * | 11/2020 | Vondrell | B64D 35/08 |
| 2004/0201309 | A1 | * | 10/2004 | Wong | H01H 29/18 |
| | | | | | 310/328 |
| 2008/0096713 | A1 | * | 4/2008 | Beson | F16H 3/721 |
| | | | | | 475/16 |
| 2008/0098882 | A1 | * | 5/2008 | Smith | F15B 15/125 |
| | | | | | 92/68 |
| 2010/0069837 | A1 | * | 3/2010 | Rassat | A61M 25/10 |
| | | | | | 604/99.04 |
| 2012/0090952 | A1 | * | 4/2012 | Lee | F16D 41/08 |
| | | | | | 192/41 R |
| 2015/0377142 | A1 | * | 12/2015 | Sheridan | F02C 7/275 |
| | | | | | 60/778 |
| 2017/0184159 | A1 | * | 6/2017 | Suzuki | F16D 41/07 |
| 2018/0058518 | A1 | * | 3/2018 | Uppal | F16D 25/12 |
| 2019/0323568 | A1 | * | 10/2019 | Uppal | F16D 27/10 |

* cited by examiner

*Primary Examiner* — Timothy Hannon
(74) *Attorney, Agent, or Firm* — Lightfoot & Alford PLLC (57) ABSTRACT

A sprag clutch has an inner race, an outer race, and a radial cavity between the races. A plurality of sprags are disposed in the radial cavity, and each sprag is configured to rotate about an axis of rotation that is perpendicular to its longitudinal axis. A sprag cage retains each of the plurality of sprags at a uniform spacing within the radial cavity, and a plurality of actuators are positioned to exert or withdraw a force upon a corresponding sprag.

14 Claims, 7 Drawing Sheets

MECHANISM AND METHOD TO ENGAGE/DISENGAGE A SPRAG CLUTCH USING ACTUATORS

CROSS-REFERENCE TO RELATED APPLICATIONS

Not Applicable.

BACKGROUND

Sprag clutches are used to transfer torque between a driving member, such as a clutch outer race, and a driven member, such as a transmission. Sprag clutches typically comprise a cylindrical outer race and a cylindrical inner race and a plurality of sprags positioned between the outer race and the inner race. The plurality of sprags are typically retained in the radial space between the two races by a sprag cage. A sprag clutch is sometimes referred to as an overrunning clutch or a freewheeling clutch.

In the typical configuration, either the inner race or the outer race rotates until the sprags are wedged into place. This configuration allows for torque to be transferred between the inner and outer races. For example, if the inner race and sprags are rotating at a first speed and the sprags are then wedged into the outer race, then the outer race begins to rotate at the same speed and transfer torque to a driven member. Once the driven member begins to rotate faster than the inner race, the sprags slip free and the inner race rotates independent of the outer race. An alternative to the example is when the driven member is rotating at a desired speed, the inner race is rotated relatively slower than the outer race in order to free the sprags and decouple the races. Other means to engage or disengage the sprag clutch include using hydraulic pressure to move the clutch components until the sprags engage or disengage. Existing sprag clutch designs try to reduce friction and wear of the clutch by moving the sprags away from either the inner race or the outer race.

The major deficiency of existing sprag clutches is the number of moving parts necessary to engage and disengage the sprags when the clutch is moving at the desired rotational speed. What is needed is a device that can couple/decouple the inner and outer races with fewer parts.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes a sprag clutch that may be used in an aircraft. In some examples, the aircraft is a single engine aircraft and in other examples the aircraft is a two-engine aircraft. The disclosed sprag clutch comprises a plurality of actuators to engage or disengage the clutch. According to this disclosure, the actuators may be piezoelectric actuators or bimetallic actuators. Using the actuators to disengage the clutch provides a simpler way to activate the sprag clutch over the known art.

Figure 1:
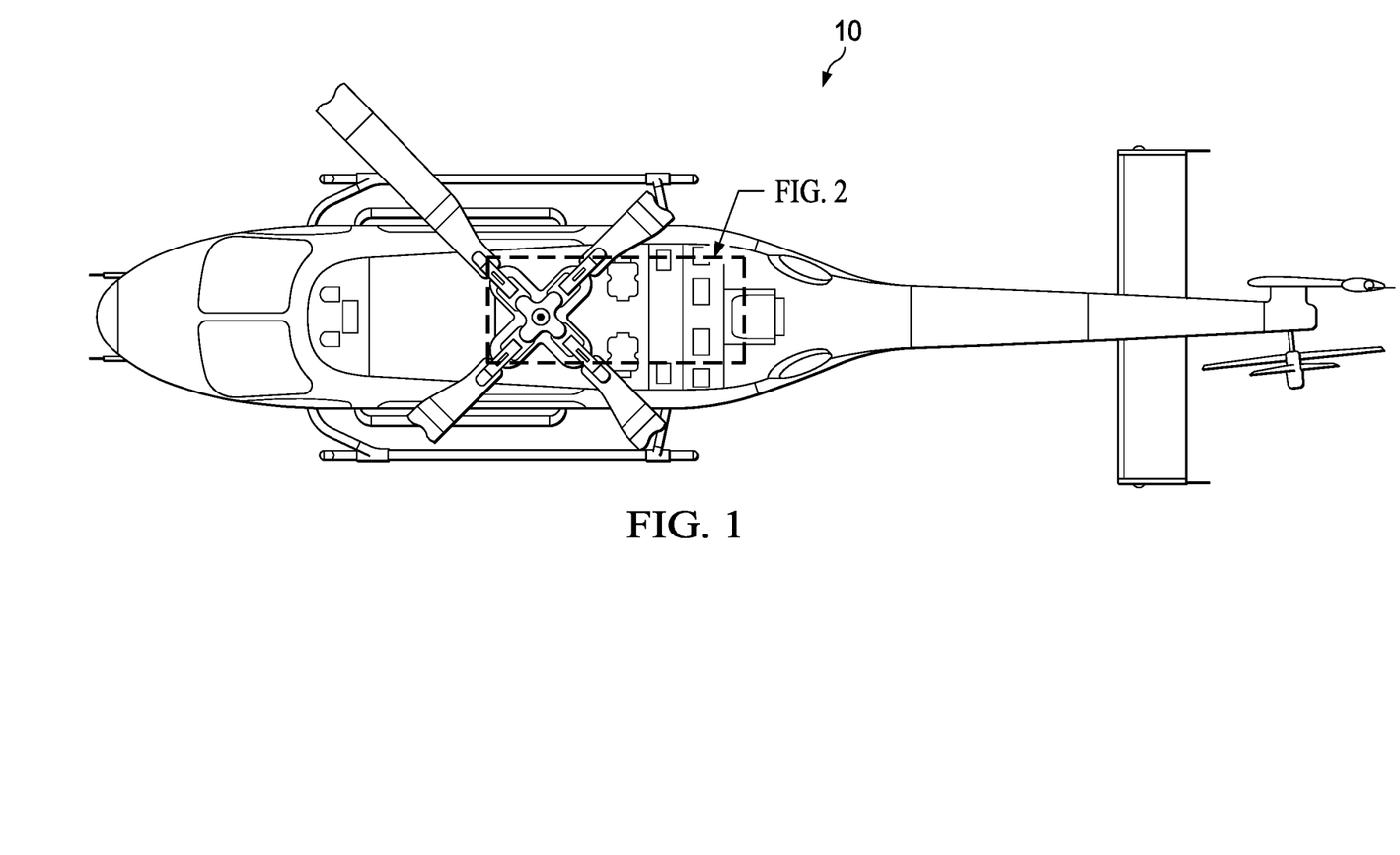
FIG. 1 illustrates a two-engine rotary aircraft.
Figure 2:
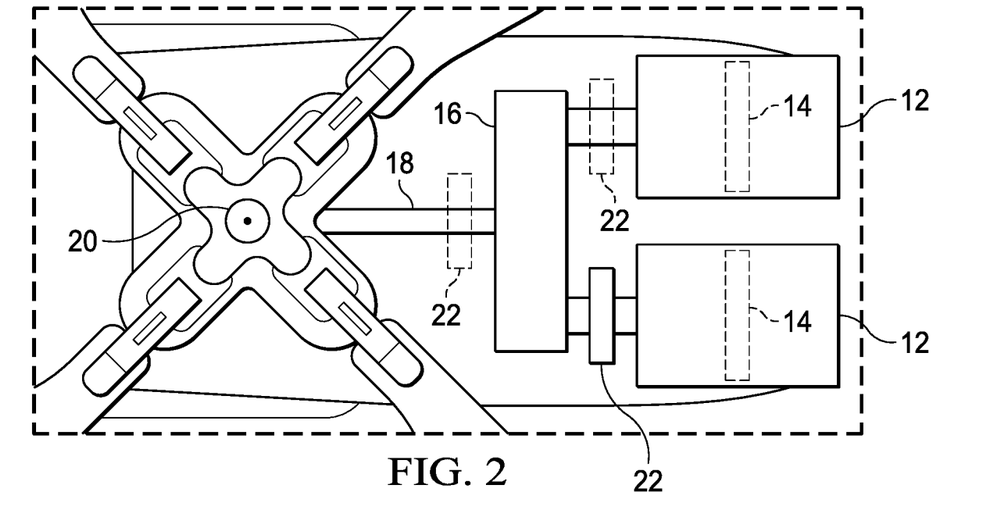
FIG. 2 illustrates a two-engine schematic configuration according to this disclosure for the rotary aircraft in FIG. 1.
Figure 3:
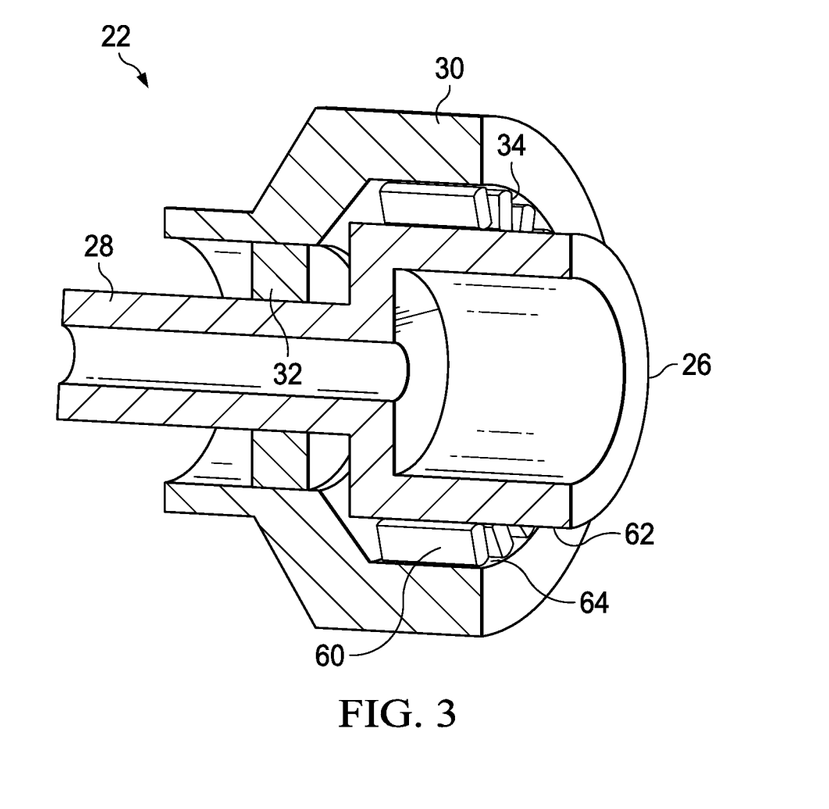
FIG. 3 illustrates a perspective sectional view of the clutch of the disclosed embodiments.

The disclosed sprag clutch may be used on an aircraft, such as the rotary aircraft illustrated in FIGS. 1 and 2. However, the disclosed sprag clutch applies to any aircraft with an engine and drivetrain.

In existing sprag clutches, the inner and outer races rotate with the sprags in one direction. The sprags have a shape that prevents them from engaging (i.e., wedging) between the inner and outer races when the inner race rotates slower than the outer race. In this mode, torque will not transfer between these inner and outer races. When the inner race rotates as fast or faster than the outer race, each sprag rotates within the clutch about an axis of rotation that is perpendicular to its longitudinal axis until each sprag wedges between the inner race and outer race. In the second mode, torque will transfer between the inner and outer races.

Unlike existing sprag clutches, sprag clutches according to this disclosure use actuators to rotate the sprags within the sprag cage to engage and disengage the clutch.

Piezoelectric actuators are one type of actuator disclosed. When using piezoelectric actuators in the sprag clutch, each of the piezoelectric actuators are positioned to exert a force upon a corresponding sprag. Each piezoelectric actuator rotates the corresponding sprag within the sprag cage about an axis of rotation that is perpendicular to the sprag's longitudinal axis to engage or disengage the clutch. Positive and negative voltage applied to the piezoelectric actuators controls the expansion or contraction of the piezoelectric actuators. One end of each of the piezoelectric actuators is positioned to exert a force or withdraw a force from a sprag. Since each sprag within the sprag cage rotates about its axis of rotation that is perpendicular to its longitudinal axis, the expansion or contraction of the piezoelectric actuators is the exertion or withdrawal of the force that rotates the sprag.

In a configuration to disengage the clutch using a positive voltage, the piezoelectric actuators are positioned to exert force to the sprags and rotate the sprag away from engagement. This configuration has a positive voltage applied to each of the piezoelectric actuators causing them to extend. The expansion of each of the piezoelectric actuators exerts a force to a corresponding sprag which causes the sprag to rotate within the sprag cage. The rotation creates a gap between an end of each sprag and the inner race, the outer race, or both. This prevents the sprags from wedging between the surfaces of the inner and outer races while creating the gap. When disengaged, torque cannot transfer between the inner race and the outer race.

Using the same configuration, the application of a negative voltage causes each of the piezoelectric actuators to contract and withdraw a force to a corresponding sprag. This causes the sprag to rotate within the sprag cage about an axis of rotation that is perpendicular to its longitudinal axis and eliminate a gap between at least one end of each sprag and the inner race, the outer race, or both. This action causes the sprags to wedge between the surfaces of the inner and outer races thereby eliminating the gap. When engaged, torque transfers between the inner race and the outer race.

In an alternate configuration engaging the clutch using a positive voltage, a piezoelectric actuator is positioned on an opposite side of the sprag from the previous configuration to disengage a clutch using positive voltage. A positive voltage applied to each of the piezoelectric actuators causes each of the piezoelectric actuators to extend, and each of the piezoelectric actuators exerts a force to a corresponding sprag. This causes the sprag to rotate within the sprag cage about an axis of rotation that is perpendicular to its longitudinal axis. The rotation eliminates a gap between an end of each sprag and the inner race, the outer race, or both. This action causes the sprags to wedge between the surfaces of the inner race, the outer race, or both, thereby eliminating the gap. When engaged, torque transfers between the inner race and the outer race.

In a configuration to disengage the clutch using a negative voltage, a piezoelectric actuator is positioned on an opposite side of the sprag from the previous configuration to engage a clutch using negative voltage. By applying a negative voltage to each of the piezoelectric actuators, each piezoelectric actuator contracts and withdraws the force to a corresponding sprag. This contraction causes the sprag to rotate within the sprag cage about an axis of rotation that is perpendicular to its longitudinal axis. The rotation creates a gap between at least one end of each sprag and the inner race, the outer race, or both. This prevents the sprags from wedging between the surfaces of the inner race, the outer race, or both while creating the gap. When disengaged, torque cannot transfer between the inner race and the outer race.

Using piezoelectric actuators creates a repeatable process of actuator expansion and contraction. To engage the clutch, the piezoelectric actuators extend or contract to ensure the sprags engage and transfer torque to the driven member. To disengage the clutch, the piezoelectric actuators contract or extend and disengage. The disengagement stops the transfer of torque by the clutch.

Multiple sets of piezoelectric actuators can be used on each sprag to have redundant systems in case one or more individual actuators fail. As illustrated in the figures, one or two sets of piezoelectric actuators are positioned to exert or withdraw a force on the sprags. When used, the second set of piezoelectric actuators provide a secondary system in case one or more of the actuators in the first set fail to activate.

It may be necessary to create stacks of piezoelectric actuators to get the desired actuator displacement. That is, several piezoelectric actuators are stacked together to create a single actuator with a greater expansion displacement, or stroke length, than a single actuator would normally have. Those having skill in the art have the knowledge to obtain the desired stroke length and force from a piezoelectric actuator by creating a stack of piezoelectric actuators. The actuator may be assembled in a stack to increase the displacement produced by the piezoelectric actuator. Those having skill in the art can appropriately size the piezoelectric actuator stack for the design displacement needed for the sprags.

When using bimetallic actuators instead of piezoelectric actuators, the bimetallic actuators are also positioned to exert or withdraw a force on the sprags. The bimetallic actuators rotate the sprags within the sprag cage to engage or disengage the clutch. Bimetallic actuators extend and contract in response to temperature. When the bimetallic actuators are subjected to a first temperature, the sprags are held in place with a gap between the sprags and either the inner or outer races, or the sprags are held in place with no gap between the sprags and both the inner and outer races. When the bimetallic actuators are subjected to a second temperature, the sprags are rotated to create a gap between the sprags and the inner race, the outer race, or both, or the sprags are rotated to close the gap between the sprags and the inner race, the outer race, or both.

As known to those skilled in the art, bimetallic actuator movement is dependent upon the two metals used, the material properties of those metals, and the temperatures the bimetallic actuators are subjected to. Accordingly, the distance of expansion and contraction of the bimetallic actuator is dependent upon the selected actuator properties.

When the bimetallic actuators rotate the sprags to wedge between the inner and outer races, torque is transferred between the inner race and the outer race. When the bimetallic actuators rotate the sprags and create a gap between the sprags and either the inner race, the outer race, or both, torque is no longer being transferred by the clutch. The rotation is controlled by the temperature the bimetallic actuators are subjected to.

In some cases, it is beneficial to provide a heat exchange system to subject the clutch to a second temperature. If a heat exchange system is used, it may be used to heat or cool the inner race, the sprags, and/or the outer race. A heat exchange system can be any system known to those having skill in the art and it may be attached or embedded within the inner race, the sprags, and/or the outer race.

An aircraft 10 having an engine 12 and a drivetrain is disclosed. The aircraft 10 may be a single engine aircraft 10 or a multi-engine aircraft 10. The sprag clutch 22 according to this disclosure may be positioned anywhere in the drivetrain of the aircraft 10 to include within or attached to at least one of the engines 12.

To illustrate the invention, a non-limiting example aircraft 10 is illustrated as a two-engine 12 rotorcraft. In one embodiment, sprag clutch 22 is inserted within the drivetrain between at least one engine 12 and the rotor hub 20. The illustrated drivetrain in the non-limiting example includes engines 12 with each having a transmission 14. In the example, each transmission 14 is coupled to a torque combining gearbox 16 and provides torque thereto. The torque combining gearbox 16 is coupled to a driveshaft 18 providing torque input to a rotor hub 20 from the torque combining gearbox 16.

In a preferred embodiment, at least one of the engines 12 is able to function as an auxiliary power unit (APU) for providing electrical power, hydraulic pressure, and/or bleed air without rotating the other engine 12 or the rotor hub 20. For example, the clutch 22 is positioned between the engine 12 capable of serving as an APU and the other of the engines 12 and the rotor hub 20 or between a single engine 12 and the rotor hub 20. These non-limiting examples illustrate that the clutch 22 can be positioned at any number of locations and within any number of components in a drivetrain/powertrain of an aircraft 10.

Referring to FIGS. 3-6 and 8, the clutch 22 comprises an inner race 26, a shaft 28, an outer race 30, at least one bearing 32, a plurality of sprags 34, a sprag cage 36, and a plurality of actuators 38. Actuators 38 may be either piezoelectric actuators or bimetallic actuators. A radial cavity 37 is positioned between the inner race 26 and outer race 30. The plurality of sprags 34 are disposed within the radial cavity 37. The shaft 28 and at least one bearing 32 are illustrated as extending outwardly from clutch 22. However, this is only for illustrations purposes. It is understood that the shaft 28 and the at least one bearing 32 may be positioned within the clutch 22 and not extend outwardly. Additionally, the shaft 28 may be part of a separate component that the clutch 22 attaches to. These alternate embodiments are not illustrated herein, however, the disclosed invention is applicable thereto.

The outer race 30 is disposed about the inner race 26 and the shaft 28. The outer race 30 is rotatable relative to the inner race 26. As illustrated, the shaft 28 is rotatably coupled between the bearing 32 and the outer race 30. Additionally, the shaft 28 is illustrated as also being coupled to the inner race 26.

The sprag cage 36 is rotatably positioned between the inner race 26 and the outer race 30 within radial cavity 37. In one embodiment, the sprag cage 36 has at least one annular retaining ring 42 positioned to retain sprags 34 at a uniform spacing within the radial cavity 37 and provide a fixed point for sprags 34 to rotate about an axis of rotation 46 perpendicular to its longitudinal axis 48.

In an alternate embodiment, the sprag cage 36 further includes an optional rotation stop ring 44 that limits the rotation of sprags 34 within the sprag cage 36 by providing at least one stop 45. When used, the at least one stop 45 may be positioned radially closer to the inner race 26 or radially closer to the outer race 30. Alternatively, the stop 45 may be positioned near both the inner race 26 and the outer race 30. To simplify the disclosed invention, a non-limiting example with the at least one stop 45 is disclosed and illustrated in FIGS. 4-6, 8, and 9 as being positioned near both the inner race 26 and the outer race 30.

The plurality of sprags 34 are radially disposed within the sprag cage 36 with each of the plurality of sprags 34 rotatably attached to the annular ring 42. During rotation of the clutch 22, the sprag cage 36 allows for sprags 34 to rotate and engage the inner race 26 and the outer race 30.

Figure 5:
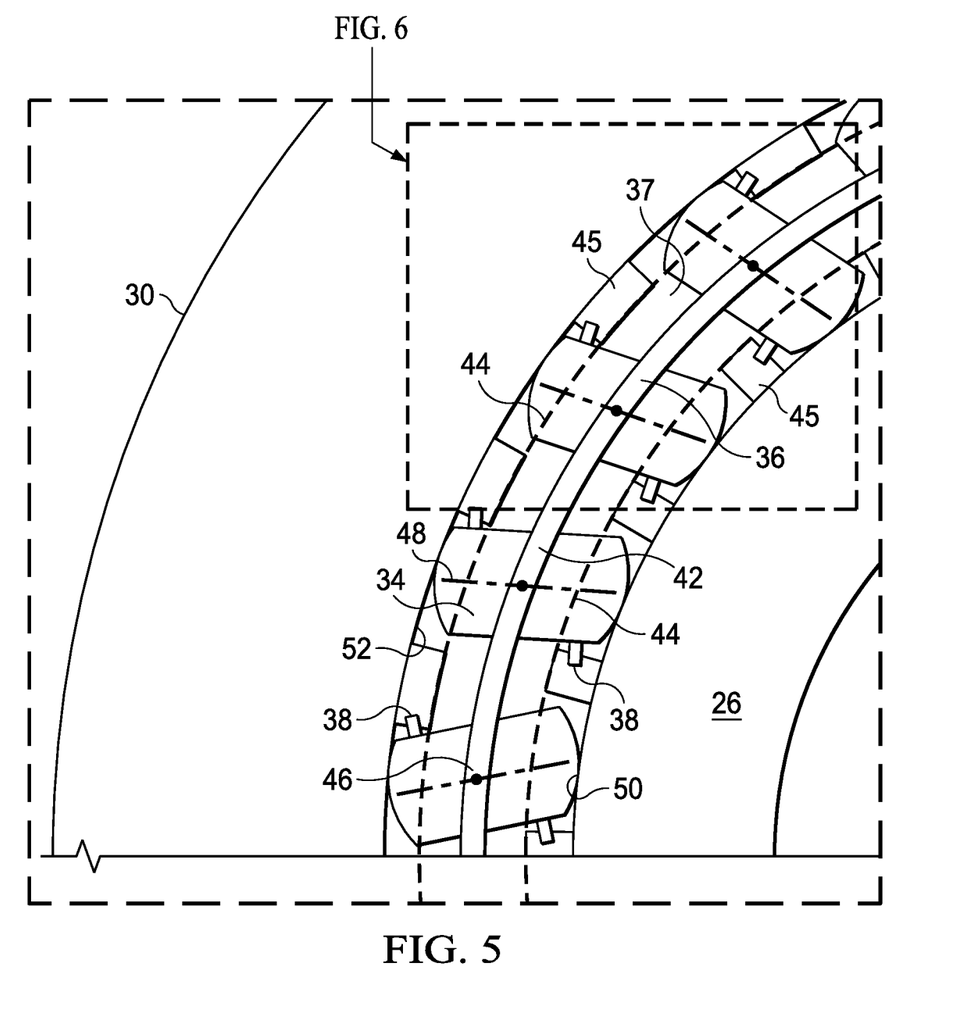
FIG. 5 illustrates a detail view taken from FIG. 4.
Figure 6:
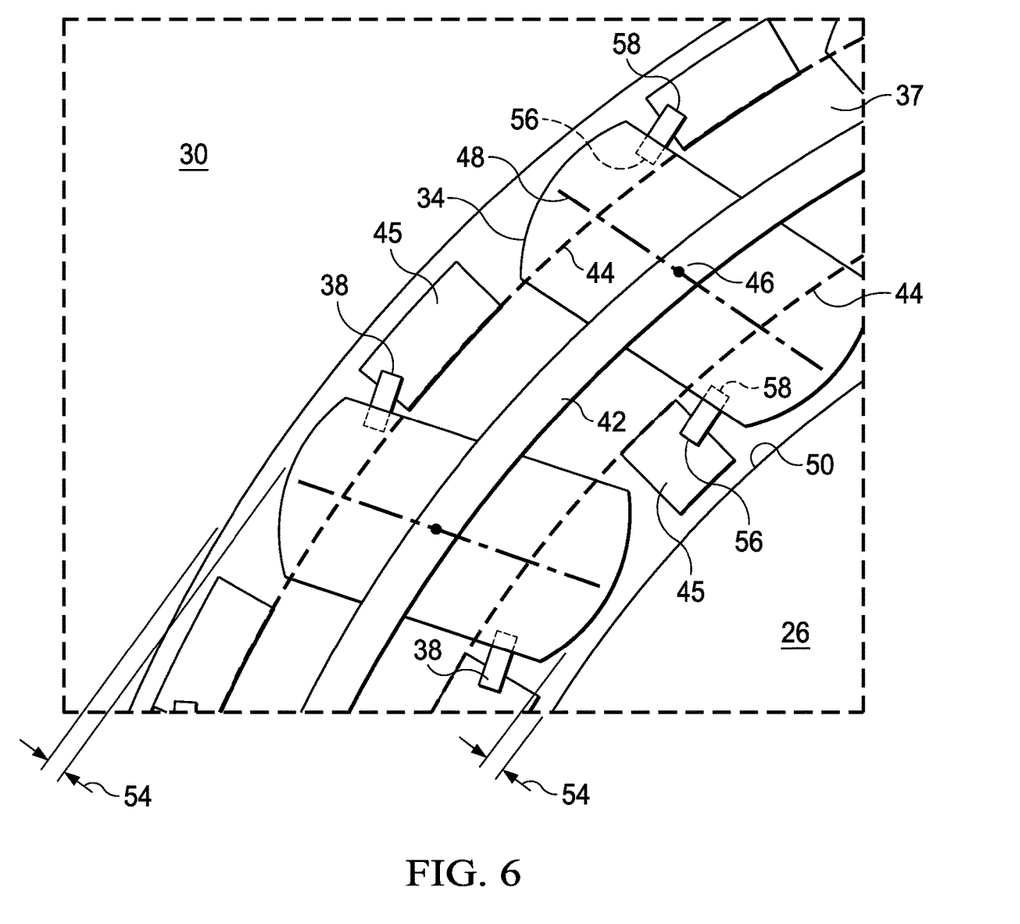
FIG. 6 illustrates a detail view taken from FIG. 5.
Figure 9:
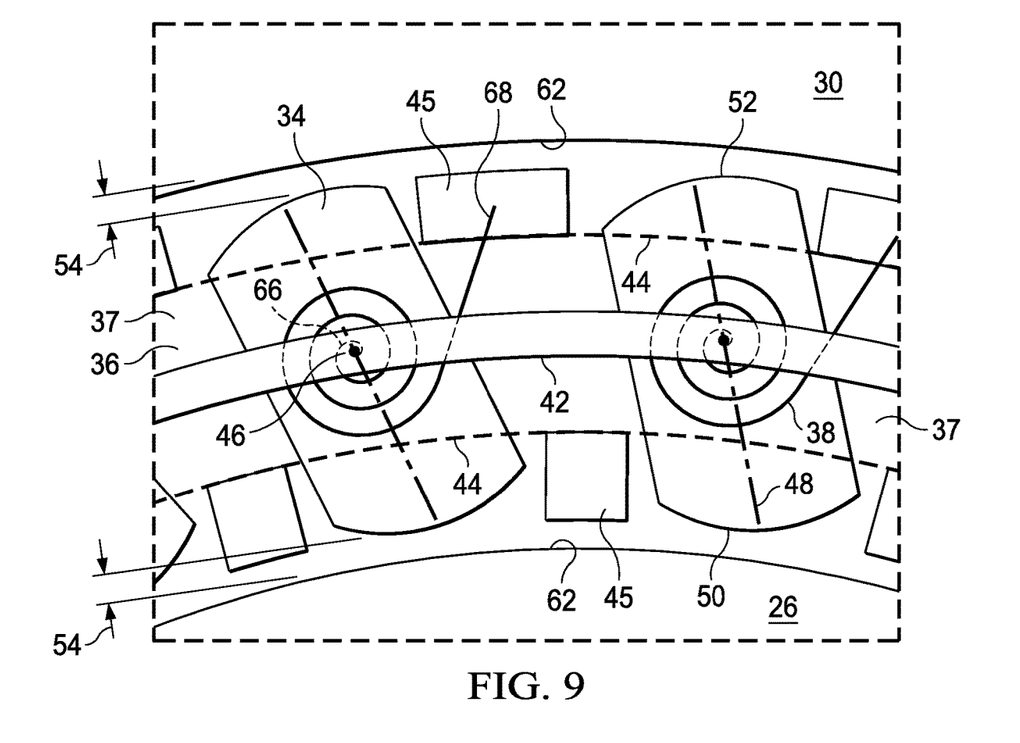
FIG. 9 illustrates a detail view taken from FIG. 8.

FIGS. 5, 6 and 9 illustrate a plurality of sprags 34 with each positioned to rotate about its axis of rotation 46. This rotation allows for sprags 34 to engage and disengage clutch 22. Sprags 34 have a sprag first end 50 and a sprag second end 52. When clutch 22 is disengaged, a gap 54 forms between at least one of the sprag first end 50 and/or sprag second end 52 and the at least one of the inner race 26 and/or the outer race 30.

Although the axis of rotation 46 may be anywhere in the sprag 34, preferably, the axis of rotation 46 is positioned radially along the sprag's longitudinal axis 48, as illustrated in FIGS. 5 and 6. Longitudinal axis 48 is oriented between sprag first end 50 and sprag second end 52. Sprags 34 may rotate about the axis of rotation 46 such that sprag 34 operates as a lever from either the sprag first end 50 or the sprag second end 52. When the sprag 34 operates as a lever, the annular ring 42 is positioned closer to either the inner race 26 or the outer race 30.

When clutch 22 is engaged, the sprag first end 50 is in contact with an outer surface 62 of the inner race 26 and the sprag second end 52 is in contact with an inner surface 64 of the outer race 30. When clutch 22 is disengaged, gap 54 forms between the sprag first end 50 and the outer surface 62 of the inner race 26 and/or the sprag second end 52 and the inner surface 64 of the outer race 30.

Referring to FIGS. 4-7b, each of the piezoelectric actuators 38 has a sprag end 56 and a race end 58. The sprag end 56 is positioned to exert or withdraw a force to a sprag surface 60. In one embodiment the sprag end 56 is adjacent to the sprag surface 60. In an alternative embodiment, the sprag end 56 is attached to the sprag surface 60. In another alternative embodiment, the sprag end 56 is embedded within an individual sprag 34. The race end 58 is affixed to the optional rotation stop ring 44 of the sprag cage 36.

Piezoelectric actuators 38 require an electrical power source (not shown) to supply voltage to the piezoelectric actuators 38 so as to be able to actuate. The electrical power source may be a battery, a wireless power source, or any other power source capable of actuating the piezoelectric actuators 38. The electric power source is in electrical communication with each of the piezoelectric actuators 38.

Figure 4:
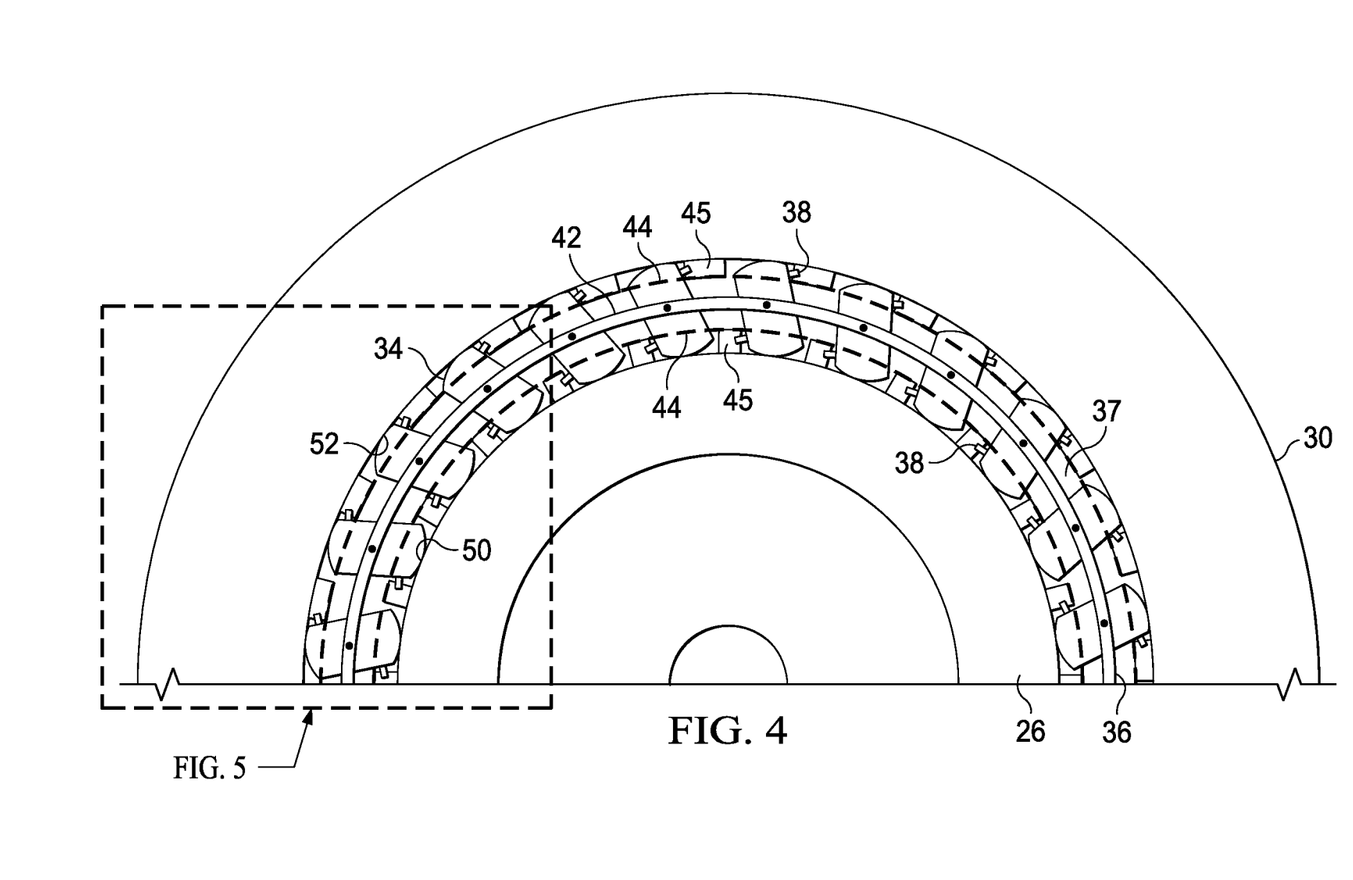
FIG. 4 illustrates a schematic view of FIG. 3 with piezoelectric actuators.

FIGS. 4-6 illustrate two piezoelectric actuators 38 positioned to exert a force to each of the plurality of sprags 34. In one embodiment, only one piezoelectric actuator 38 is used for each sprag 34. In another embodiment, two piezoelectric actuators 38 are used for each sprag 34. The use of the second piezoelectric actuator 38 is to provide a backup system in case the first actuator 38 fails to activate. As illustrated, the two piezoelectric actuators 38 are oppositely positioned on each side of longitudinal axis 48 of sprag 34. This placement allows the two piezoelectric actuators 38 to work together to exert or withdraw a force to each sprag 34 and thereby engage and disengage the clutch 22.

Figure 7A:
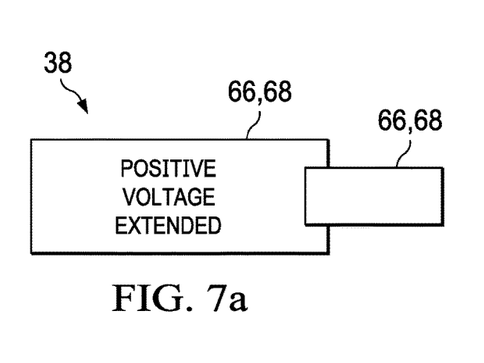
FIGS. 7a and 7b illustrate a piezoelectric actuator with positive and negative voltage.
Figure 7B:
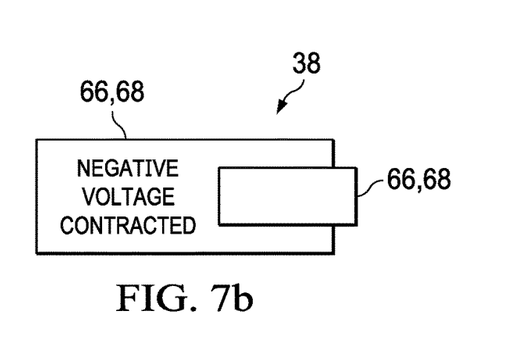

As stated above, piezoelectric actuators 38 can extend or contract. FIG. 7a illustrates the piezoelectric actuator 38 in an extended condition resulting from positive voltage, and FIG. 7b illustrates the piezoelectric actuator 38 in a contracted condition resulting from negative voltage.

Figure 8:
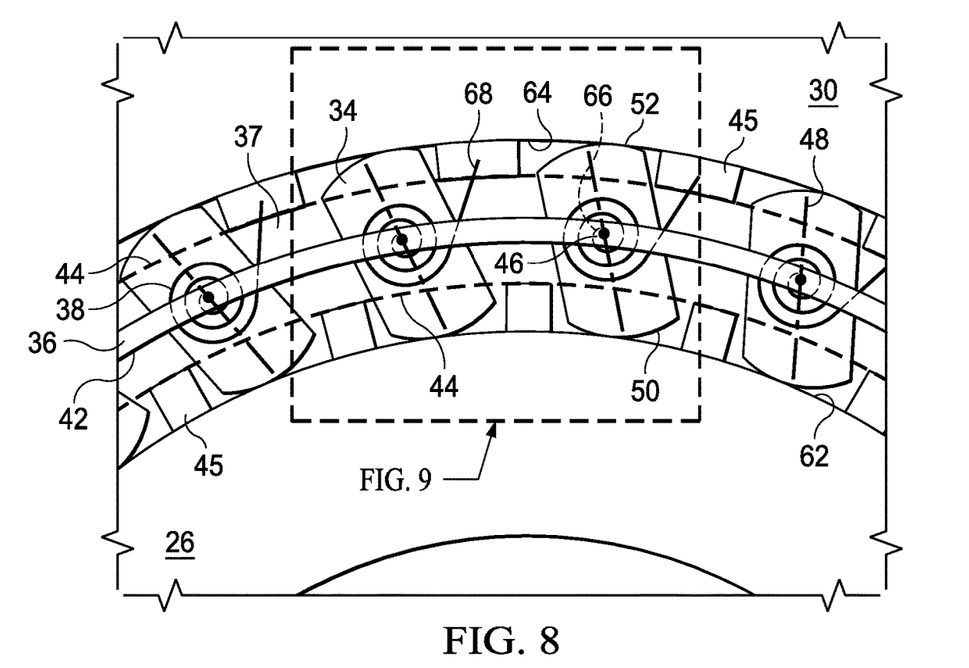
FIG. 8 illustrates an end view of FIG. 3 with bimetallic actuators.

Referring to FIGS. 8-10, bimetallic actuators 38 are illustrated. The bimetallic actuators 38 may be positioned to exert or withdraw a force to a sprag surface 60. In one embodiment, bimetallic actuators 38 are adjacent to the sprag surface 60. In an alternative embodiment, the sprag end 56 is embedded within or affixed to sprags 34. Each of the bimetallic actuators 38 have an actuator first end 66 and an actuator second end 68. Each sprag 34 has its own bimetallic actuator 38 with the actuator first end 66 adjacent to, embedded within, or affixed to an individual sprag 34. In one embodiment, each actuator second end 68 is positioned to push against annular ring 42. In the alternate embodiment using the optional rotation stop ring 44, each actuator second end 68 is positioned to push against an individual stop 45.

Figure 10A:
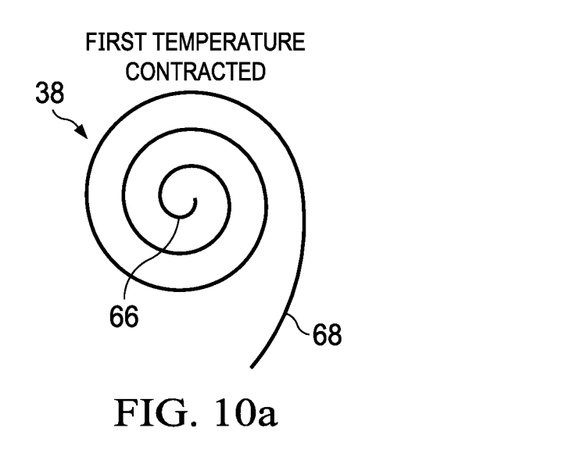
FIGS. 10a through 10d illustrate various states of a bimetallic actuator at a first temperature state and a second temperature state.
Figure 10B:
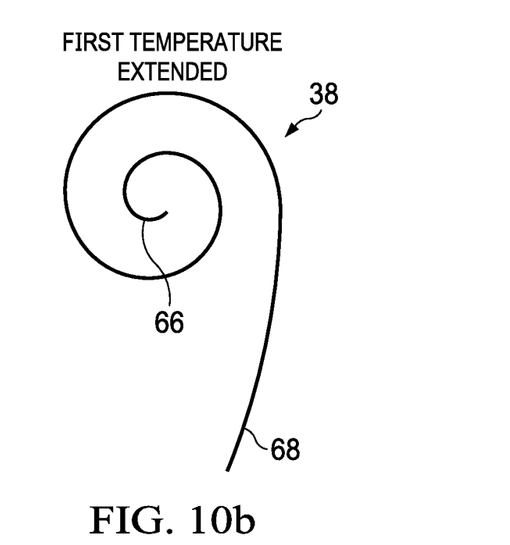
Figure 10C:
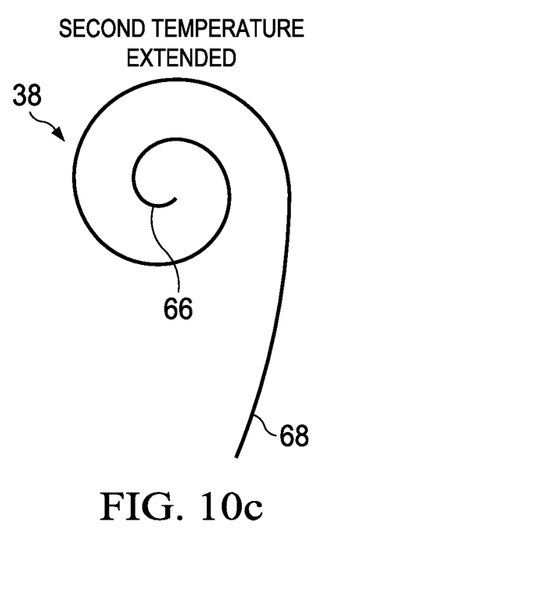
Figure 10D:
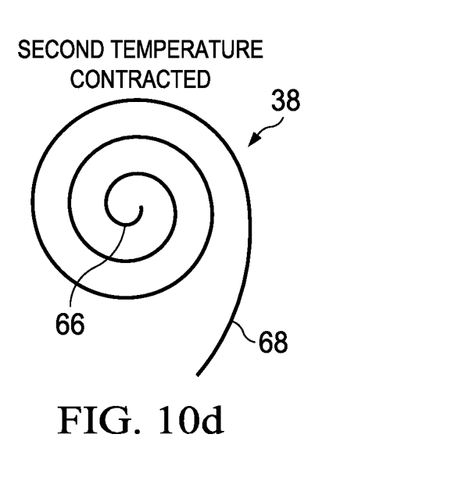

Referring to FIGS. 10a-d, the bimetallic actuator 38 is illustrated in an extended or contracted state. FIG. 10a illustrates the bimetallic actuator 38 at a first temperature and in a contracted state. As illustrated in FIG. 8b, the bimetallic actuator 38 is in an extended state at the first temperature. FIG. 10c illustrates the bimetallic actuator 38 in an extended state at a second temperature, and FIG. 10d illustrates the bimetallic actuator 38 in a contracted state at the second temperature. Depending upon the material properties, the bimetallic actuators 38 may be in a contracted condition at a first temperature, or the bimetallic actuator 38 may be in an extended condition at a first temperature. When the temperature around the bimetallic actuator 38 changes from the first temperature and increases or decreases to the second temperature, the bimetallic actuator 38 changes to an opposite condition from the first temperature and may be either extended or contracted.

Although not shown, a heat exchange system may be used with the clutch 22 to provide cooling or heating to the inner race 26, the sprags 34, and/or the outer race 30. The heat exchange system is used to subject the clutch 22 to a second temperature. If used, the heat exchange system is associated with the clutch 22 and may be affixed to or in contact with the clutch 22. The heat exchange system provides cooling or heating to the inner race 26, the plurality of sprags 34, and/or the outer race 30, wherein the heat exchange system is used to subject the clutch 22 to a temperature change. In one embodiment, the heat exchange system cools only one of inner race 26, the sprags 34, and/or the outer race 30. In another embodiment, the heat exchange system cools or heats only two of inner race 26, the sprags 34, and/or the outer race 30. In still another embodiment, the entire clutch 22 is cooled. If a heat exchange system is used, it is used to subject the clutch 22 to the second temperature. And, if it is used, the heat exchange system changes the temperature of at least one of the inner race 26, the outer race 30, and/or the sprags 34.

A method of engaging or disengaging a sprag clutch 22 is disclosed. The method comprises inputting a rotation force to the clutch 22 and actuating a plurality of actuators 38. The clutch 22 comprising the components described herein. The method includes rotating each of the plurality of sprags 34 about its axis of rotation 46, wherein the actuating of each of the plurality of actuators 38 causes the rotation. The method further comprises creating a gap 54 for each sprag 34 between the sprag first end 50 and the inner race 26 and/or between the sprag second end 52 and the outer race 30, wherein the extending of each of the plurality of actuators 38 exerts the force on the sprag first end 50 and/or the sprag second 52, the exerting of the force causing each of the plurality of sprags 34 to rotate about its axis of rotation 46, wherein the creating of the gap 54 disengages the clutch 22. The method further comprises closing a gap 54 for each sprag 34 between the sprag first end 50 and the inner race 26 and/or between the sprag second end 52 and the outer race 30, wherein the contracting of each of the plurality of actuators 38 withdraws the force on the sprag first end 50 and/or the sprag second end 52, the withdrawing of the force causing each of the plurality of sprags 34 to rotate about its axis of rotation 46, wherein the closing of the gap 54 engages the clutch 22. In an embodiment, the method includes the sprag first end 50 contacting the outer surface 62 of the inner race 26 and/or the sprag second end 52 contacting the inner surface 64 of the outer race 30.

Referring to the piezoelectric actuators 38, a method of disengaging or engaging the clutch 22 by applying a positive or negative voltage to the piezoelectric actuators 38 is provided. The application of the positive or negative voltage drives or actuates each of the piezoelectric actuators 38 to exert or withdraw a force by extending or contracting, and the exertion or withdrawal of the force by each piezoelectric actuator 38 causes a corresponding sprag 34 to rotate about its axis of rotation 46 that is perpendicular to its longitudinal axis 48.

Still referring to the method to engage or disengage the clutch 22 of the aircraft 10 by applying a positive or negative voltage, the exerting or withdrawing force to each of the sprags 34 includes rotating each sprag 34 about its axis of rotation 46 such that a gap 54 is created between the sprag first end 50 and the inner race 26 and/or a gap 54 is created between the sprag second end 52 and the outer race 30. Alternatively, applying a positive or negative voltage includes exerting or withdrawing force to each of the sprags 34 and rotating each sprag 34 about its axis of rotation 46 such that gap 54 is eliminated between the sprag first end 50 and the inner race 26 and/or that the gap 54 is eliminated between the sprag second end 52 and the outer race 30.

Depending upon the positioning of each of the plurality of actuators 38, the application of positive voltage causes each of the plurality of actuators 38 to extend and exert or withdraw the force on each of the sprags 34. Similarly, the application of negative voltage causes each of the plurality of actuators 38 to contract and withdraw or exert the force on each of the sprags 34.

In an alternative embodiment, the method of rotating the plurality of sprags 34 includes contacting the sprag second end 52 and/or the sprag first end 50 with stop 45 when optional rotation stop ring 44 is also part of clutch 22. In another embodiment, race end 58 of each of the plurality of actuators 38 pushes against stop 45.

An alternative method of engaging or disengaging a clutch 22 on an aircraft 10 is provided wherein the plurality of actuators 38 are bimetallic actuators 38. The bimetallic actuators 38 are as described above. The method further comprises subjecting the clutch 22 to a temperature change, and wherein the temperature change causes each of the plurality of actuators 38 to extend or contract. Depending upon the placement of the bimetallic actuators 38 relative to the longitudinal axis 48 of sprags 34, the extension exerts or withdraws a force to sprags 34. The exertion or withdrawal of the force by each bimetallic actuator 38 causes a corresponding sprag 34 to rotate about its axis of rotation 46 that is perpendicular to its longitudinal axis 48.

The method of disengaging the clutch 22 using bimetallic actuators 38 comprises operating the clutch 22 at a first temperature, wherein the bimetallic actuators 38 hold the plurality of sprags 34 in a closed position at the first temperature with first sprag end 50 in contact with the outer surface 62 of the inner race 26 and/or the sprag second end 52 with the inner surface 64 of the outer race 30. The method further includes subjecting clutch 22 to a temperature change, wherein an operating temperature of the clutch 22 changes from the first temperature to a second temperature. After the change to the second temperature, the clutch 22 is operated at the second temperature. The bimetallic actuators 38 extend or contract when subjected to the second temperature and rotate each of the plurality of sprags 34 about their axes of rotation 46. A gap 54 is created between the first sprag end 50 when it rotates away from outer surface 62 of the inner race 26 and/or the sprag second end 52 rotates away from the inner surface 64 of the outer race 30.

The method of engaging the clutch 22 using bimetallic actuators 38 comprises operating the clutch 22 at a first temperature, wherein the bimetallic actuators 38 hold a gap 54 between the first sprag end 50 and the outer surface 62 of the inner race 26 and/or the sprag second end 52 and the inner surface 64 of the outer race 30. The method further includes subjecting clutch 22 to a temperature change, wherein an operating temperature of the clutch 22 changes from the first temperature to a second temperature. After the change to the second temperature, the clutch 22 is operated at the second temperature. The bimetallic actuators 38 extend or contract when subjected to the second temperature and rotate each of the plurality of sprags 34 about their axes of rotation 46. The gap 54 is eliminated between the first sprag end 50 and the outer surface 62 of the inner race 26 and/or the sprag second end 52 and the inner surface 64 of the outer race 30.

If not relying upon ambient temperature changes during the operation of the clutch 22, the method of changing the temperature from the first temperature to a second temperature includes using a heat exchanger to subject the clutch 22 to a temperature change.

Although in the foregoing illustrations the clutch has been shown and described as a separate component, in some embodiments, one or more clutches may be incorporated into an aircraft driveline.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) according to this disclosure.

What is claimed is:

1. A sprag clutch comprising:
    an inner race;
    an outer race;
    a radial cavity between the inner and outer races;
    a plurality of sprags disposed in the radial cavity between the inner and outer races, each sprag having a first end, a second end, and a longitudinal axis oriented between the first end and the second end, each sprag being rotatable about an axis of rotation that is perpendicular to its longitudinal axis;
    a sprag cage positioned to retain the sprags at a uniform spacing within the radial cavity;
    a plurality of actuators, each actuator positioned to exert or withdraw a force upon a corresponding sprag, each actuator being:
        a piezoelectric actuator; or
        a bimetallic actuator, wherein a heat exchange system associated with the clutch provides cooling or heating to the inner race, the plurality of sprags, and/or the outer race, wherein the heat exchange system is capable of subjecting the clutch to a temperature change for actuating each bimetallic actuator.

2. The clutch of claim 1, wherein each actuator has a race end positioned near the inner race or the outer race and a sprag end proximate a corresponding sprag.

3. The clutch of claim 2, further comprising a rotation stop positioned radially near the outer race and/or radially near the inner race.

4. The clutch of claim 2, wherein at least one actuator is located on each side of the axis of rotation of each sprag.

5. The clutch of claim 1, further comprising an electric power source, the electric power source being in electrical communication with each piezoelectric actuator and configured to selectively provide a positive voltage or negative voltage thereto.

6. A method of engaging or disengaging a sprag clutch, the method comprising:
    inputting a rotation force to the clutch, the clutch further comprising:
        an inner race;
        an outer race;
        a radial cavity between the inner and outer races;
        a plurality of sprags disposed in the radial cavity between the inner and outer races, each sprag having a first end, a second end, and a longitudinal axis oriented between the first end and the second end, each sprag being rotatable about an axis of rotation that is perpendicular to its longitudinal axis;
        a sprag cage positioned to retain the sprags at a uniform spacing within the radial cavity;
        a plurality of actuators, each actuator being a piezoelectric actuator or bimetallic actuator and positioned to exert or withdraw a force upon a corresponding sprag; and
    actuating the plurality of actuators to engage or disengage the clutch by applying a voltage to actuate each piezoelectric actuator or subjecting the clutch to a temperature change to actuate each bimetallic actuator.

7. The method of claim 6, further comprising rotating each of the plurality of sprags about its axis of rotation, wherein actuating each of the plurality of actuators causes the rotating.

8. The method of claim 7, further comprising creating a gap for each sprag between the first end and the inner race and/or between the second end and the outer race, wherein the extending of each of the plurality of actuators exerts the force on the first end and/or the second end, the exerting of the force causing each of the plurality of sprags to rotate about its axis of rotation, wherein the creating of the gap disengages the clutch.

9. The method of claim 7, further comprising closing a gap for each sprag between the first end and the inner race and/or between the second end and the outer race, wherein the contracting of each of the plurality of actuators withdraws the force on the first end and/or the second end, the withdrawing of the force causing each of the plurality of sprags to rotate about its axis of rotation, wherein the closing of the gap engages the clutch.

10. The method of claim 6, wherein applying a positive voltage causes each piezoelectric actuator to extend and applying a negative voltage causes each piezoelectric actuator to contract.

11. An aircraft, comprising:
    an engine operably coupled to a drivetrain for causing rotation thereof;
    a sprag clutch coupling the engine to the drivetrain, the sprag clutch further comprising:
        an inner race;
        an outer race;

a radial cavity between the inner and outer races;
a plurality of sprags disposed in the radial cavity between the inner and outer races, each sprag having a first end, a second end, and a longitudinal axis oriented between the first end and the second end, wherein each sprag is rotatable about an axis of rotation that is perpendicular to its longitudinal axis;
a sprag cage positioned to retain the sprags at a uniform spacing within the radial cavity; and
a plurality of actuators, each actuator being positioned to exert or withdraw a force upon a corresponding sprag, each actuator being:
a piezoelectric actuator; or
a bimetallic actuator, wherein a heat exchange system associated with the clutch provides cooling or heating to the inner race, the plurality of sprags, and/or the outer race, wherein the heat exchange system is capable of subjecting the clutch to a temperature change for actuating each bimetallic actuator.

12. The aircraft of claim 11, further comprising at least one rotation stop for each sprag and positioned radially near the outer race or radially near the inner race.

13. The aircraft of claim 11, wherein at least one actuator is located on each side of the axis of rotation of each sprag.

14. The aircraft of claim 11, wherein the clutch further comprises an electric power source in electrical communication with each of the piezoelectric actuators and configured for selectively providing a positive voltage or negative voltage thereto.

* * * * *